(12) United States Patent
Zhou et al.

(10) Patent No.: US 8,758,859 B2
(45) Date of Patent: Jun. 24, 2014

(54) HOUSING AND METHOD FOR MAKING SAME

(75) Inventors: Shu-Xiang Zhou, Shenzhen (CN); Qiu-Jiang Xu, Shenzhen (CN); He-Xian Lin, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 14 days.

(21) Appl. No.: 13/524,317

(22) Filed: Jun. 15, 2012

(65) Prior Publication Data

US 2013/0284736 A1    Oct. 31, 2013

(30) Foreign Application Priority Data

Apr. 25, 2012    (CN) .......................... 2012 1 0123050

(51) Int. Cl.
*B05D 3/02*      (2006.01)

(52) U.S. Cl.
USPC ..... 427/379; 427/372.2; 427/387; 427/393.5; 427/397.7; 427/402; 427/407.1; 428/447

(58) Field of Classification Search
None
See application file for complete search history.

(56) References Cited

U.S. PATENT DOCUMENTS 6,096,469 A *   8/2000   Anderson et al. ............. 427/256
6,387,453 B1 *   5/2002   Brinker et al. ................ 427/387

\* cited by examiner

*Primary Examiner* — Timothy Meeks
*Assistant Examiner* — Michael P Rodriguez
(74) *Attorney, Agent, or Firm* — Novak Druce Connolly Bove + Quigg LLP

(57) ABSTRACT

A housing includes a plastic substrate, an active layer formed on the plastic substrate, and an exterior layer formed on the active layer. The active layer contains polysiloxane and cetyl trimethyl ammonium bromide. The exterior layer contains silicon dioxide or titanium dioxide, and cetyl trimethyl ammonium bromide.

9 Claims, 1 Drawing Sheet

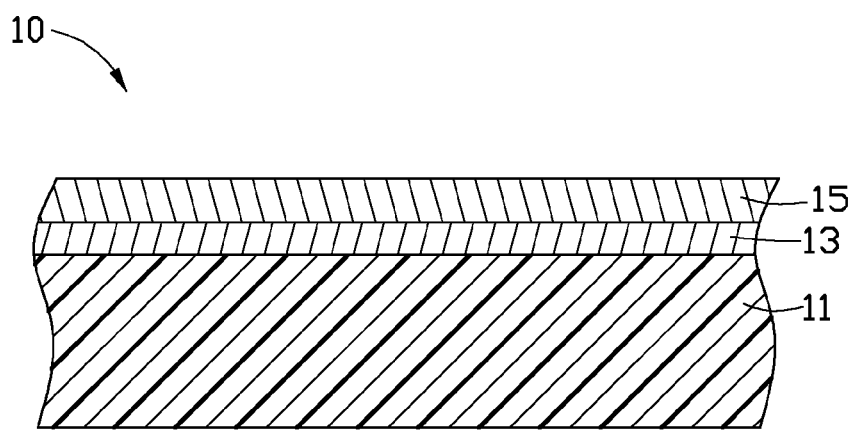

HOUSING AND METHOD FOR MAKING SAME

BACKGROUND

1. Technical Field

The present disclosure relates to a housing and a method for making the housing.

2. Description of Related Art

Housings of electronic devices are usually spray painted to form paint coatings on the housings. However, on some parts of the housing, such as corner regions or bended regions, the paint coating commonly has an uneven thickness and the thickness in these parts is usually greater than the desired or designed thickness. This is because that during the spray painting process, paint is prone to accumulate at the corner regions or bended regions. Thickness of the paint coating may be decreased to avoid the accumulation of the paint. However, the paint commonly has a high viscosity, therefore, reducing the thickness of the paint coating can cause an unevenness of the entire paint coating.

Therefore, there is room for improvement within the art.

BRIEF DESCRIPTION OF THE FIGURE

Many aspects of the housing can be better understood with reference to the following drawing. The components in the drawing are not necessarily drawn to scale, the emphasis instead being placed upon clearly illustrating the principles of the housing. Moreover, in the drawing like reference numerals designate corresponding parts throughout the drawing.

The FIGURE is a cross sectional view of an exemplary embodiment of a housing.

DETAILED DESCRIPTION

The FIGURE shows a housing 10 according to an exemplary embodiment. A method for making the housing 10 may include the following steps.

A plastic substrate 11 is provided.

Silane coupling agent, organic solvent, and deionized water are mixed, then a leveling agent is added to make an activator. The mass ratio of the silane coupling agent, organic solvent, deionized water, and leveling agent is (3-5):(85-92):(3-5):(5-10), respectively. The activator is left standing for about 30 min and then coated on the surface of the plastic substrate 11.

The organic solvent can be, for example, isopropyl alcohol or ethanol, but not limited to the two substances. The organic solution acts as a diluent.

The leveling agent is cetyl trimethyl ammonium bromide (CTAB). The leveling agent facilitates the leveling of the activator on the plastic substrate 11 to make the activator coat evenly on the surface of the plastic substrate 11.

The activator is coated on the plastic substrate 11 by a spray painting or a dipping process, and then dried at an environmental temperature of about 80° C. to about 100° C. for about 20 min to about 40 min to form an active layer 13. The active layer 13 contains CTAB and polysiloxane, wherein the mass ratio of CTAB to polysiloxane is (5-10):(90-95). The active layer 13 has a thickness of about 0.1 µm to about 0.3 µm.

Silicon ester or titanium ester, organic solvent, and deionized water are mixed, and then a leveling agent is added to make a coating solution. Nano calcium carbonate water solution may also be added to the coating solution. The nano calcium carbonate water solution can improve the hardness of the coatings formed using the coating solution. The mass ratio of silicon ester or titanium ester, organic solvent, deionized water, and leveling agent is (45-55):(35-45):(3-5):(3-5), respectively.

The silicon ester, or the titanium ester improves the ability of the coating solution to form a film. The silicon ester may be methyl silicate or tetraethyl silicate. The titanium ester may be tetrabutyl titanate.

The organic solvent can be, for example, isopropyl alcohol or ethanol, but not limited to the two substances. The organic solution acts as a diluent. The leveling agent is CTAB.

The coating solution is coated on the active layer 13 by a spray painting process, and then dried at an environmental temperature of about 100° C. to about 120° C. for about 30 min to about 50 min to form an exterior layer 15. The exterior layer 15 contains mainly silicon dioxide or titanium dioxide, and also contains CTAB and calcium carbonate. The exterior layer 15 has a thickness of about 0.6 µm to about 1.0 µm.

The housing 10 shown in the FIGURE includes the plastic substrate 11, the active layer 13 formed on the plastic substrate 11, and the exterior layer 15 formed on the active layer 13. The active layer 13 contains polysiloxane and CTAB, and the mass ratio of CTAB to polysiloxane is (5-10):(90-95). The active layer 13 has a thickness of about 0.1 µm to about 0.3 µm. The exterior layer 15 contains mainly silicon dioxide or titanium dioxide, and also contains CTAB and calcium carbonate. The exterior layer 15 has a thickness of about 0.6 µm to about 1.0 µm.

The active layer 13 and the exterior layer 15 evenly form on the plastic substrate 11. The active layer 13 and the exterior layer 15 provide the housing 10 an improved hardness and abrasion resistance.

EXAMPLE

Experimental example of the present disclosure is described as followings.

A plastic substrate 11 made of polycarbonate was provided, and the pencil hardness of the plastic substrate 11 was 3B.

Silane coupling agent, ethanol, deionized water, and CTAB were mixed to make the activator, wherein the mass ratio of silane coupling agent, ethanol, deionized water, and CTAB was 5:90:5:5, respectively. The activator was coated on the plastic substrate 11 by spray painting, and then dried at an environmental temperature of about 90° C. for about 30 min to form the active layer 13.

Tetraethyl silicate, ethanol, and deionized water were mixed, and then CTAB was added to obtain a coating solution. The mass ratio of tetraethyl silicate, ethanol, deionized water, and CTAB was 50:40:5:5, respectively. The coating solution was coated on the plastic substrate 11 by spray painting, and then dried at an environmental temperature of about 100° C. for about 40 min to form the exterior layer 15.

The pencil hardness of the housing 10 is F, which is much higher than the pencil hardness of the substrate 11.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. A method for making a housing, comprising:
   providing a plastic substrate;
   forming an activator by mixing silane coupling agent, organic solvent, deionized water, and a leveling agent, the mass ratio of the silane coupling agent, organic solvent, deionized water, and leveling agent being (3-5):(85-92):(3-5):(5-10), the leveling agent of the activator being cetyl trimethyl ammonium bromide;

coating the activator on the surface of the plastic substrate and drying to form an active layer;

forming a coating solution by mixing silicon ester or titanium ester, organic solvent, deionized water, and a leveling agent, the mass ratio of the silicon ester or titanium ester, organic solvent, deionized water, and leveling agent being (45-55):(35-45):(3-5):(3-5), the leveling agent of the coating solution being cetyl trimethyl ammonium bromide; and coating the surface of the active layer with the coating solution and drying the coating solution to form an exterior layer.

2. The method as claimed in claim 1, wherein the organic solvent of the activator and the coating solution is isopropyl alcohol or ethanol.

3. The method as claimed in claim 1, wherein the drying of the activator is carried out at an environmental temperature of about 80° C. to about 100° C. for about 20 min to about 40 min.

4. The method as claimed in claim 1, wherein the active layer has a thickness of about 0.1 μm to about 0.3 μm.

5. The method as claimed in claim 1, wherein the silicon ester is methyl silicate or tetraethyl silicate.

6. The method as claimed in claim 1, wherein the titanium ester is tetrabutyl titanate.

7. The method as claimed in claim 1, wherein the coating solution further comprises nano calcium carbonate.

8. The method as claimed in claim 1, wherein the drying of the coating solution is carried out at an environmental temperature of about 100° C. to about 120° C. for about 30 min to about 50 min.

9. The method as claimed in claim 1, wherein the exterior layer has a thickness of about 0.6 μm to about 1.0 μm.

* * * * *